April 24, 1962     D. R. CLEMONS     3,031,003
APPARATUS FOR FABRICATING PARTS FROM CONTINUOUS STOCK
Filed Oct. 21, 1958     2 Sheets-Sheet 1
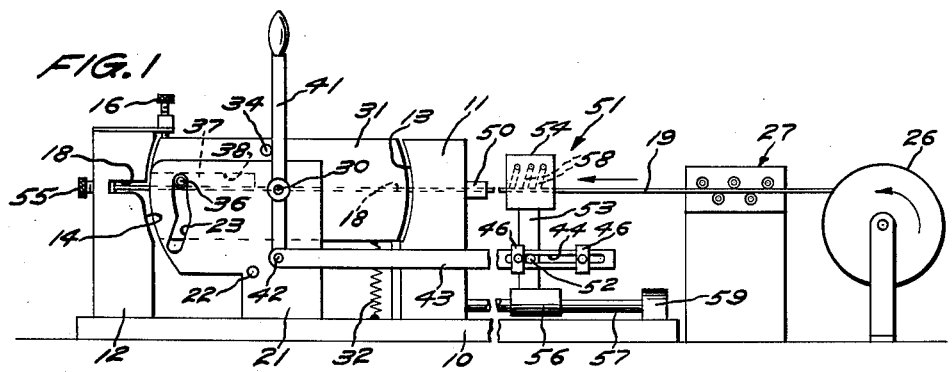
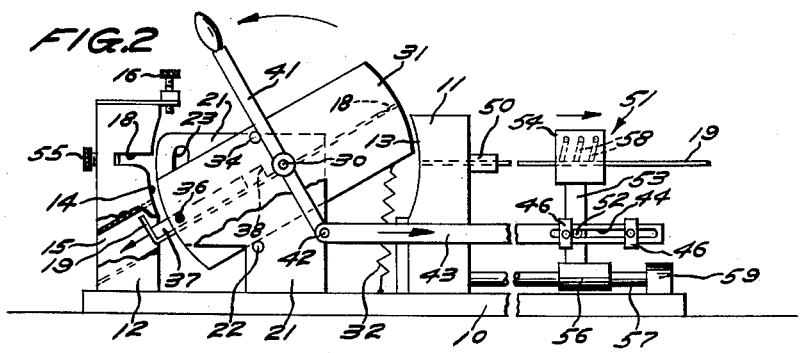
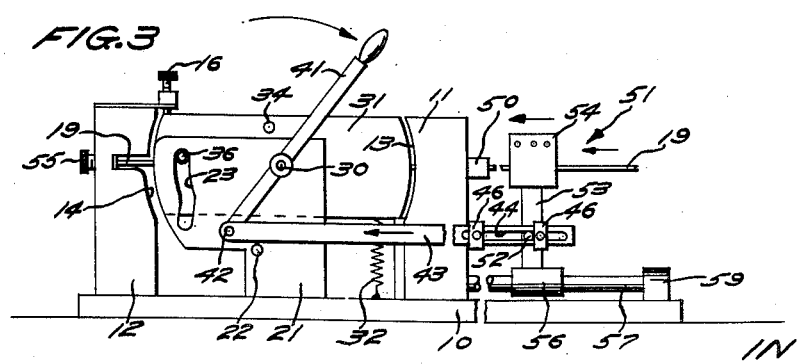
INVENTOR
D. R. CLEMONS
BY R. P. Miller
ATTORNEY April 24, 1962   D. R. CLEMONS   3,031,003
APPARATUS FOR FABRICATING PARTS FROM CONTINUOUS STOCK
Filed Oct. 21, 1958   2 Sheets-Sheet 2

INVENTOR
D. R. CLEMONS
BY R. P. Miller
ATTORNEY

United States Patent Office 3,031,003
Patented Apr. 24, 1962

3,031,003
APPARATUS FOR FABRICATING PARTS FROM CONTINUOUS STOCK
Dale R. Clemons, Riverside, Ill., assignor to Western Electric Company, Incorporated, New York, N.Y., a corporation of New York
Filed Oct. 21, 1958, Ser. No. 768,648
3 Claims. (Cl. 153—2)

This invention relates to an apparatus for fabricating parts from a source of continuous stock and more particularly to a movable die mechanism which shears and forms a predetermined length of stock in a single operation.

In the fabrication of shaped parts from a source of continuous stock, it is desirable to provide a forming die that not only shapes the stock but also severs the stock into required length. Further, in order to facilitate rapid manufacture, the shaping die should provide instrumentalities for automatically ejecting the finished part in anticipation of a subsequent cycle of operation. Speed of operation can be enhanced if the die can perform the required function in one continuous movement, thereby eliminating the need for auxiliary power-driven mechanisms.

It is a prime object of this invention to provide an apparatus for fabricating shaped parts from a source of continuous stock while eliminating the necessity of utilizing a highly complicated apparatus.

Another object of this invention is to provide die elements which accomplish a shearing and forming action in one simultaneous operation.

A further object of the invention is to provide a fabricating apparatus with an ejecting mechanism for automatically dispensing a formed part.

It is another object of this invention to provide a stock-fabricating apparatus that times the feeding of the stock in proper relation with the forming and shearing operations.

With these and other objects in view, the present invention contemplates the use of a pair of spaced die members with a movable die block positioned therebetween. One of the members is provided with a shearing surface while the other has a recessed forming surface. The die members as well as the die block are apertured to receive a predetermined length of stock material advanced by a feed mechanism. The stock might be bar stock, wire or other similar strand material. The die block is moved relative to the spaced die members and shearing and forming operations are simultaneously accomplished as a result of the advancement of the stock relative to the shearing and forming surfaces of the die elements. An ejecting mechanism operated by the movement of the die block dispenses the formed length of stock material upon completion of the forming and shearing operations. A linkage interconnects the movable die block and feed mechanism so that an additional length of stock is advanced into the die elements upon restoration of the movable block to an initial position.

Other objects and advantages of the present invention will be apparent from the following detailed description when considered in conjunction with the accompanying drawings wherein:

FIG. 1 is a side elevation of a shearing and forming apparatus embodying the principles of the present invention;

FIG. 2 is another side elevational view with a portion broken away illustrating the apparatus in an ejecting position;

FIG. 3 is a similar side elevational view of the apparatus in a loading or feeding position;

Figure 4:
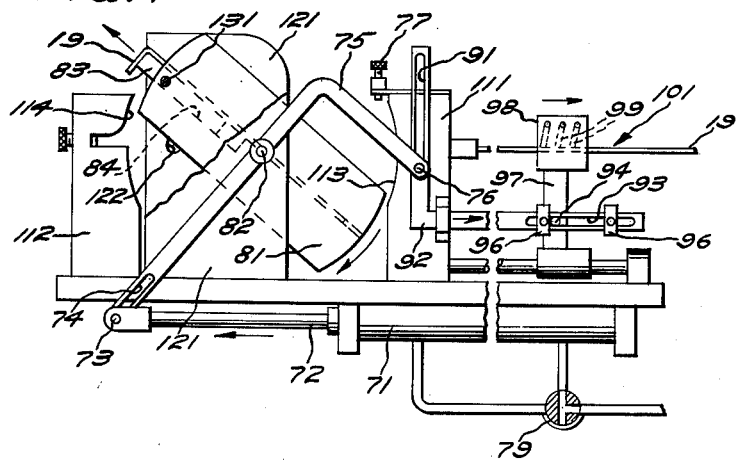
FIG. 4 is a side elevational view, partially broken away, of another embodiment of a shearing and forming apparatus.

Referring to FIGS. 1 through 3, there is disclosed a base or bed plate 10 upon which a pair of die members 11 and 12 is mounted in spaced relationship to each other. The first of said die members 11 is provided with a shearing surface 13 while the second of said members 12 has a forming surface 14 constructed therein. Also mounted on the base 10 is a pair of side plates 21 (FIG. 2) which are utilized as both guide and support means. Positioned between die members 11 and 12 is a die block 31 having a pair of trunnions 30 extending therefrom into suitable bearings mounted in the plates 21.

The movably mounted die block 31 is free to rotate, but such rotation is limited in a counterclockwise direction by a pair of stop lugs 22 stationarily mounted on the plates 21. A spring 32 is provided to urge the die block 31 into an initial rest position. Accurate repositioning of said die block is attained by an adjustable stop element 16 which is secured to the die member 12. Rotatably mounted on one of the trunnions 30 is a lever or actuating bar 41. A lug 34 is secured to the die block and positioned so as to be engaged by the lever 41 to transfer the force of the lever action to the die block. This action of the lever 41 in cooperation with the lug 34 results in the desired rotation of the die block.

The lever 41 is connected by means of a pin 42 to a link 43. The link 43 is provided with a longitudinal slot 44 for receiving a pin 52 of a feed mechanism generally designated by the numeral 51. The link 43 is further provided with a pair of stops 46 which can be adjusted to limit the movement of the pin 52 within the slot.

Referring still to FIGS. 1, 2 and 3, there is shown a slot 23 formed within each guide or support plate 21. Positioned within each slot 23 is a guide pin 36 protruding from an ejector bar 37 which is slidably mounted within a slot 38 formed in the die block.

FIG. 1 most clearly illustrates three apertures 18 which are formed in the die members 11 and 12 and the die block 31. The apertures are bored so as to be in horizontal alignment to receive a length of stock material designated generally as 19. The stock material is delivered from a conventional supply apparatus such as a reel 26 into a straightening mechanism 27. A guide sleeve 50 is mounted on the die member 11 and insures passage of the stock material into the apertures formed in the respective die elements. An adjustable stop bolt 55 is threaded into the member 12 to extend into the aperture 18. This bolt is utilized to control the length of stock that projects beyond the die block 31 and is to be bent. The die block 31 supports a measured length of the stock 19 in the aperture therein and determines the length of the long leg of the L-shaped part formed from the sheared section of the stock.

Returning now to a consideration of the feed mechanism 51, the pin 52 projects from a support arm 53 that extends downwardly from a housing 54 which is apertured to pass stock therethrough. The housing also contains a plurality of pivotally mounted pawls 58 which, when the feed mechanism travels toward the right, pass freely over the stock material. However, when the feed mechanism travels toward the left, the pawls 58 pivot to grip and advance the stock into the apertured die elements. The lower extremity of the arm 53 is secured to a hollow cylinder 56 through which a guide rod 57 is passed. The guide rod 57 is firmly supported by the die member 11 and a bracket 59 which is mounted on the base 10.

Figure 5:
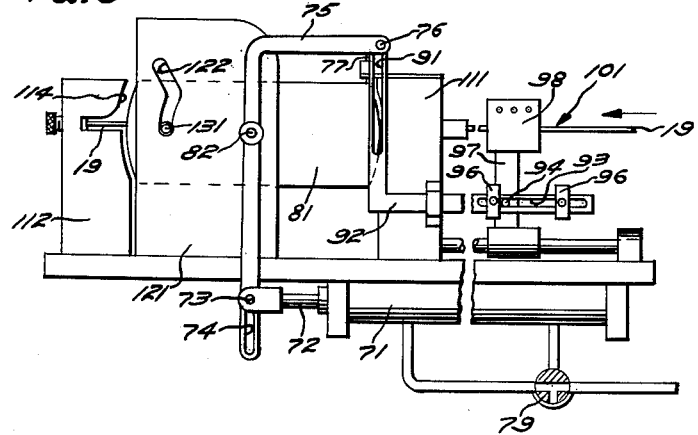
FIG. 5 is another side elevational view of this same embodiment showing the component mechanisms in an initial position.
Figure 6:
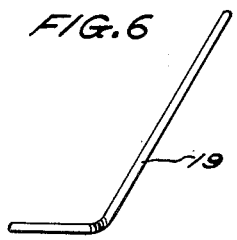
FIG. 6 is a perspective view of a section of stock formed by the apparatus shown in the other figures.

FIGS. 4 and 5 are illustrative of another embodiment of the invention which is provided with a power means for operating the die apparatus. In this instance, a pneumatic or hydraulic cylinder 71 is provided to selectively move a piston 72. The cylinder-piston arrangement is rendered effective by a valve 79 which can be electrically, mechanically or manually operated. The piston 72 is provided with a pin 73 that is slidably mounted within a slot 74 of an L-shaped lever or actuating bar 75. The actuating bar 75 is mounted on a movable die block 81, similar to die block 31, by means of a trunnion 83 that is attached to the die block. The actuating arm is further provided with a pin 76 which is slidably mounted within a slot 91 in an L-shaped link 92. The link 92 is also provided with a longitudinal slot 93 for receiving a pin 94 of a feed mechanism generally designated by the numeral 101. The link 92 is further provided with a pair of stops 96 which can be adjusted to limit the movement of the pin 94 within the slot 93.

The die block 81 is apertured as was the case with the similar structure in the previously disclosed embodiment and is positioned between a pair of die members 111 and 112 which are likewise apertured for receiving the stock material. The die members 111 and 112 are again provided with a shearing surface 113 and a forming surface 114. However, in this instance, the forming and shearing surfaces are positioned so as to be contacted by the stock material when the die block is rotated in a clockwise direction.

The die block 81 is again mounted on a pair of plates 121. Referring to FIG. 5 there is shown a slot 122 within each guide or support plate 121. Positioned within each slot 122 is a guide pin 131 protruding from an ejector bar 83 which is slidably mounted within a slot 84 formed in the die block.

The feeder mechanism 101 is similar to the feeder mechanism 51 and includes the pin 94, a support arm 97 and a housing 98. The housing, as in the prior instance, also contains a plurality of pivotally mounted pawls 99 which function in an identical manner as previously disclosed.

The cooperation of the piston member 72, the L-shaped actuating bar 75 and the link 92 eliminates the necessity of utilizing several stop lugs. However, an adjustable stop element 77 is provided to insure proper alignment of the apertures of the several die elements.

*Mode of operation*

The general mode of operation of either embodiment is essentially the same and can best be explained by reference to FIG. 1 which presents a clear illustration of the device prior to actuation through a complete cycle of forming, shearing, ejecting and refeeding operations.

FIG. 1 discloses a continuous length of stock 19 positioned within the apertures of the several die elements and extending from the supply apparatus 26 to the adjustable stop bolt 55. With the stock so positioned, a force applied to the lever 41 in the direction indicated by the arrow in FIG. 2 results in the forming of that portion of the stock extending into the aperture 18. The surface 14 is recessed within the block 12 to accommodate the bent stock during rotation of the die block 31. When the die block 31 is rotated, the lower edge of surface 13 acts against the stock to effectuate a shearing action. During this motion, the guide pins 36 follow the curvature of the slot 23 which is concentric with the axis of rotation and hence the ejector bar 37 does not move. Upon continued movement of the die block, (see FIG. 2) the pins 36 move within projecting sections of the slot and the ejector bar 37 moves relative to the block to eject the formed part through an opening 15 in the die member 12. When the lever 41 is released, the spring 32 retracts and causes a counter rotation of the die block 31 to an initial position, the repositioning being further attained by the adjustable stop element 16.

While the shearing and forming action of the stock is being accomplished by the rotation of the die block 31, the movement of the lever 41 causes the link 43 to move toward the right. The movement of the link brings the forward adjustable stop 46 in contact with the pin 52 and in doing so, results in the rearward movement of the feed mechanism 51. This action does not, however, move the stock from the die member 11 since the pivotally mounted pawls of the feed mechanism ride freely over the stock. However, when the bar 41 is brought back to the original position, the right-hand stop 46 is brought into contact with the pin 52. Further movement of the lever 41 (see FIG. 3) is then transferred to the link 43 and to the feed mechanism 51. This movement results in the pawls of the feed mechanism gripping and advancing the stock through the several apertures of the die elements until it contacts the adjustable stop bolt 55. This having been accomplished, the device is ready for a subsequent cycle of operation.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. An apparatus for fabricating parts from continuous stock comprising support means, a fixed shearing die on said support means having an aperture for guiding the stock along a predetermined path, a die block mounted on said support means adjacent said shearing die for pivotal movement from a normal first position to a second position and having an aperture therethrough of a predetermined length aligned with the aperture in said shearing die for guiding the stock therethrough and for supporting a measured length of the stock therein, said die block cooperating with said shearing die to shear the stock in response to movement of said die block from said first position to said second position, a fixed forming die on said support means adjacent the other extremity of said die block and having a stop thereon in the path of travel of the stock for stopping the stock with an end portion of the stock projecting from the die block and having surfaces for transversely bending the projecting end portion of the stock in response to movement of the die block from said first position to said second position, and means for moving said die block from said first position to said second position.

2. An apparatus for fabricating parts from continuous stock comprising support means, a fixed shearing die on said support means having an aperture for guiding the stock for movement along a predetermined path, a die block having an aperture of a predetermined length for guiding the stock therethrough and for supporting a measured length of the stock therein, means on said support means for mounting said die block for oscillatory movement about an axis disposed intermediate the extremities of the die block and transversely of said path of travel and with one extremity of the die block cooperable with said shearing die for shearing said stock, means for urging said die block to a normal first position with the aperture therein aligned with the aperture of said shearing die, means for advancing the stock along said path of travel through said die block, a fixed forming die on said support means adjacent the other extremity of said die block having a stop disposed in the path of travel of said stock for stopping the stock with a predetermined portion thereof projecting from said die block and having forming surfaces for bending the projecting end portion of the stock transversely in response to movement of said die block, and means for turning said die block about said axis to effect the severance of a section of the stock and the transverse bending of the forward end thereof.

3. An apparatus for fabricating parts from continuous stock comprising support means, a fixed shearing die on said support means having an aperture for guiding the stock for advancing movement along a predetermined path, a die block having an aperture of a predetermined length for guiding the stock therethrough and for supporting a measured length of the stock therein, means on said support means for mounting said die block for oscillatory movement about an axis disposed intermediate the extremities of said die block and transversely of said path of travel and with one extremity thereof cooperable with said shearing die for shearing said stock, means for urging said die block to a normal first position with the aperture therein aligned with the aperture of said shearing die, means for advancing the stock along said path of travel through said die block, a forming die fixedly mounted on said support means adjacent the other extremity of said die block having a stop disposed in the path of travel of said stock for stopping the stock with a predetermined portion thereof projecting from said die block and having surfaces for bending said projecting end portion of the stock transversely in response to movement of said die block, an ejecting element mounted on said die block for movement parallel to the aperture therein and engageable with the transversely bent end of the sheared section of the stock, means operable in response to movement of said die block on completion of the bending of the end portion of the stock for actuating said ejector element to effect the ejection of the sheared and formed section of stock longitudinally from the die block, and means for turning said die block about said axis in one direction to effect the shearing of a section of the stock, the transverse bending of the forward end thereof, and the ejection of the formed and sheared section.

References Cited in the file of this patent
UNITED STATES PATENTS

| | | |
|---|---|---|
| 1,336,605 | Becker | Apr. 13, 1920 |
| 1,387,683 | Bussel | Aug. 16, 1921 |
| 1,956,756 | Dillingham | May 1, 1934 |
| 1,997,098 | Beegle | Apr. 9, 1935 |
| 2,555,695 | Knight | June 5, 1951 |